United States Patent [19]

Chapman

[11] 4,298,090
[45] Nov. 3, 1981

[54] MULTI-LAYER ACOUSTIC LININGS

[75] Inventor: John F. Chapman, Solihull, England

[73] Assignee: Rolls-Royce Limited, London, England

[21] Appl. No.: 92,089

[22] Filed: Nov. 6, 1979
(Under 37 CFR 1.47)

[30] Foreign Application Priority Data

Dec. 27, 1978 [GB] United Kingdom ............... 50046/78

[51] Int. Cl.³ .............................................. E04B 1/82
[52] U.S. Cl. ..................................... 181/286; 181/292
[58] Field of Search ............... 181/213, 214, 218, 222, 181/286, 292, 288, 284, 224

[56] References Cited

U.S. PATENT DOCUMENTS

| 3,640,357 | 2/1972 | Kitching et al. | 181/292 |
| 3,819,009 | 6/1974 | Motsinger | 181/292 |
| 3,831,710 | 8/1974 | Wirt | 181/292 |
| 3,913,702 | 10/1975 | Wirt et al. | 181/286 |
| 4,150,732 | 4/1979 | Hoch et al. | 181/292 |

OTHER PUBLICATIONS

NASA, "Acoustic Treatment Development and Design", by Art Clemons, May 1979, pp. 169 and 171.

Primary Examiner—L. T. Hix
Assistant Examiner—Benjamin R. Fuller
Attorney, Agent, or Firm—Cushman, Darby & Cushman

[57] ABSTRACT

A multi-layer acoustic lining, e.g. for a flow duct in a gas turbine aeroengine, includes Helmholtz-type and tube-type resonators sandwiched between backing and facing sheets. In the invention, the ends of the tube-type resonators abut the Helmholtz resonators but are acoustically divided from them by partition means in such a way that the tube-type resonators differ from each other in resonant frequency. Variation of resonant frequency in the tube-type resonators is achieved by variation of their lengths according to which portion of the partition means acoustically divides them from the Helmholtz-type resonators, the partition means being arranged either step-wise or inclinedly between the backing and facing sheets.

10 Claims, 4 Drawing Figures

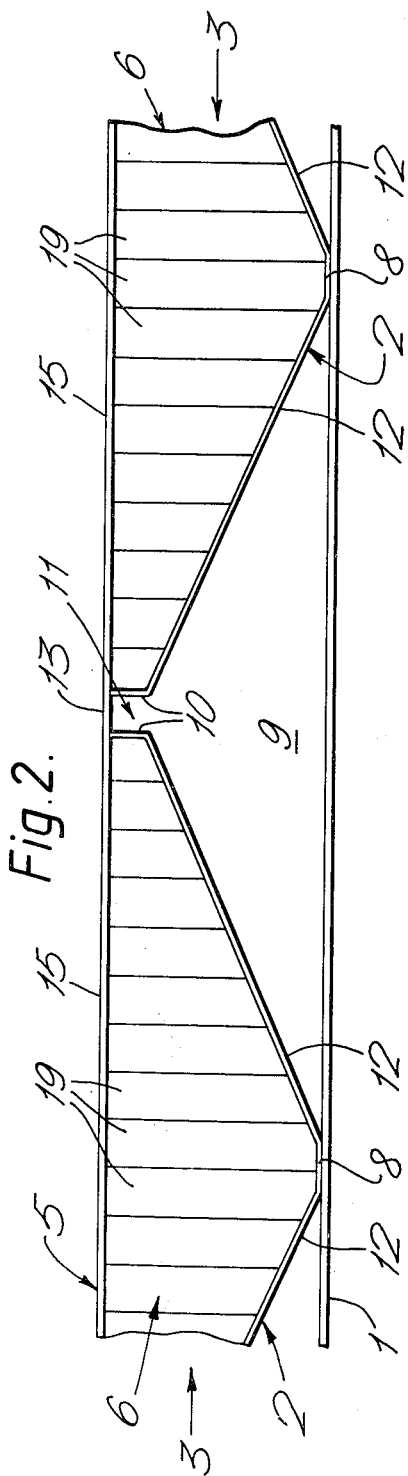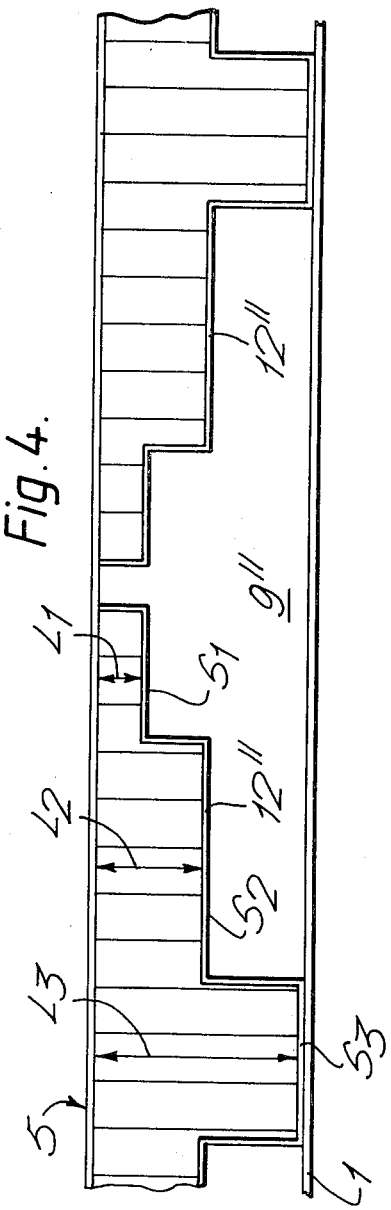

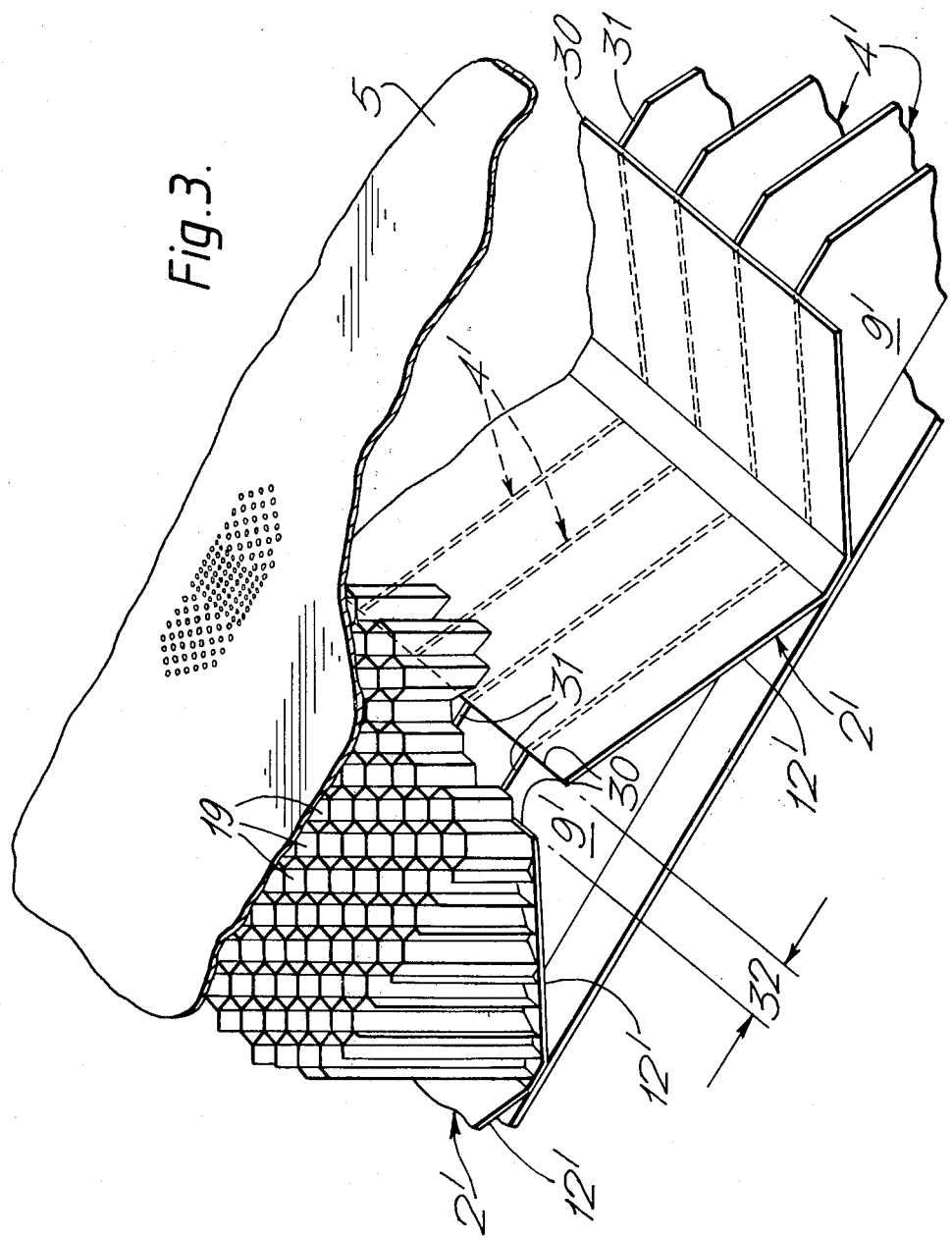

MULTI-LAYER ACOUSTIC LININGS

The present invention relates to multi-layer or "sandwich" type acoustic linings for fluid flow ducts, such as the intake or exhaust ducts of gas turbine aeroengines. The invention particularly relates to acoustic linings incorporating both Helmholtz and tube-type resonator volumes under a common sound-permeable facing sheet.

Noise generated in gas turbine aeroengines and transmitted to the environment via their intake and exhaust ducts is at a wide range of frequencies. Within the volumetric and weight limits imposed by design criteria in the aeroengine art, it is desirable to provide the ducts with acoustic linings effective to attenuate as many of those frequencies as possible, and this is best done with Helmholtz-type resonators for frequencies at the low end of the range and tube-type resonators for higher frequencies. Easily and cheaply manufactured acoustic linings which incorporate both types of resonators with efficient utilization of available space and good frequency response are required.

According to the present invention, a multi-layer acoustic lining for a fluid flow duct comprises:

an impermeable backing layer;

a compartmented airspace core structure, including a first set of compartments intended to act as Helmholtz-type resonators and a second set of compartments at least some of which are intended to act as quarter-wave tube-type resonators; and a sound permeable facing layer through which both sets of compartments are acoustically coupled to the duct:

wherein the Helmholtz-type resonators are provided with resonator necks internally of the core structure through which necks they are acoustically coupled as aforesaid, the tube-type resonators at one of their ends being acoustically coupled as aforesaid and at their other ends acoustically divided from the Helmholtz-type resonator volumes by partition means.

Such a construction makes possible an acoustic lining having at least two widely separated resonant frequencies, the acoustic lining therefore being capable of absorbing noise in a corresponding number of narrow frequency bands. The Helmholtz-type resonators are constructed to resonate to at least one low frequency and the tube-type resonators are constructed to resonate to at least one high frequency.

Preferably, the first set of compartments, or the second set of compartments, or both sets of compartments, include compartments which differ in resonant frequency frm other compartments in the same set. This provides an acoustic lining capable of absorbing noise at a greater number of frequencies.

In order to achieve an acoustic lining capable of absorbing a plurality of high frequency bands, the partition means is disposed stepwise between the facing layer and the backing layer, the tube-type resonators thereby differing in length and resonant frequency according to which step in said partition means acoustically divides them from the Helmholtz resonator volumes.

In order to achieve an acoustic lining capable of absorbing a wide band of high frequencies, the partition means is disposed at an inclination between the facing layer and the backing layer, the tube-type resonators thereby differing in length and resonant frequency according to which part of said partition means acoustically divides them from the Helmholtz-type resonator volumes.

Two opposing sides of the Helmholtz resonator compartments conveniently comprise the stepped or inclined partition means. Other sides of these compartments comprise wall members disposed transversely of the partition means and the backing and facing layers.

In order to achieve an acoustic lining capable of absorbing a plurality of low frequency bands, the Helmholtz-type resonators are constructed to differ from one to another in resonant frequency. This can be achieved either by constructing them with differing resonant volumes or with differing neck volumes. To produce an acoustic lining capable of absorbing a wide band of low frequencies, the Helmholtz-type resonators are appropriately graded in resonant frequency.

The second set of compartments, at least some of which are intended to act as tube-type resonators, conveniently comprises cellular structure of the honeycomb type.

In one embodiment of the invention, some of the second set of compartments are acoustically connected to the Helmholtz-type resonator volumes through the partition means, whereby besides acting as tube-type resonators, they also act as resonator necks for the Helmholtz-type resonators.

In another embodiment of the invention, all of the second set of compartments are acoustically divided from the Helmholtz-type resonator volumes by the partition means, portions of said partition means also forming the resonator necks for the Helmholtz-type resonators.

Embodiments of the invention will now be described by way of example only with reference to the accompanying drawings, in which:

FIG. 2 is a diagrammatic cross-sectional side elevation of the acoustic lining of FIG. 1;

FIG. 3 is a view similar to FIG. 1 showing another embodiment of the invention; and FIG. 4 is a diagrammatic cross-sectional side elevation of a further embodiment of the present invention.

Figure 1:
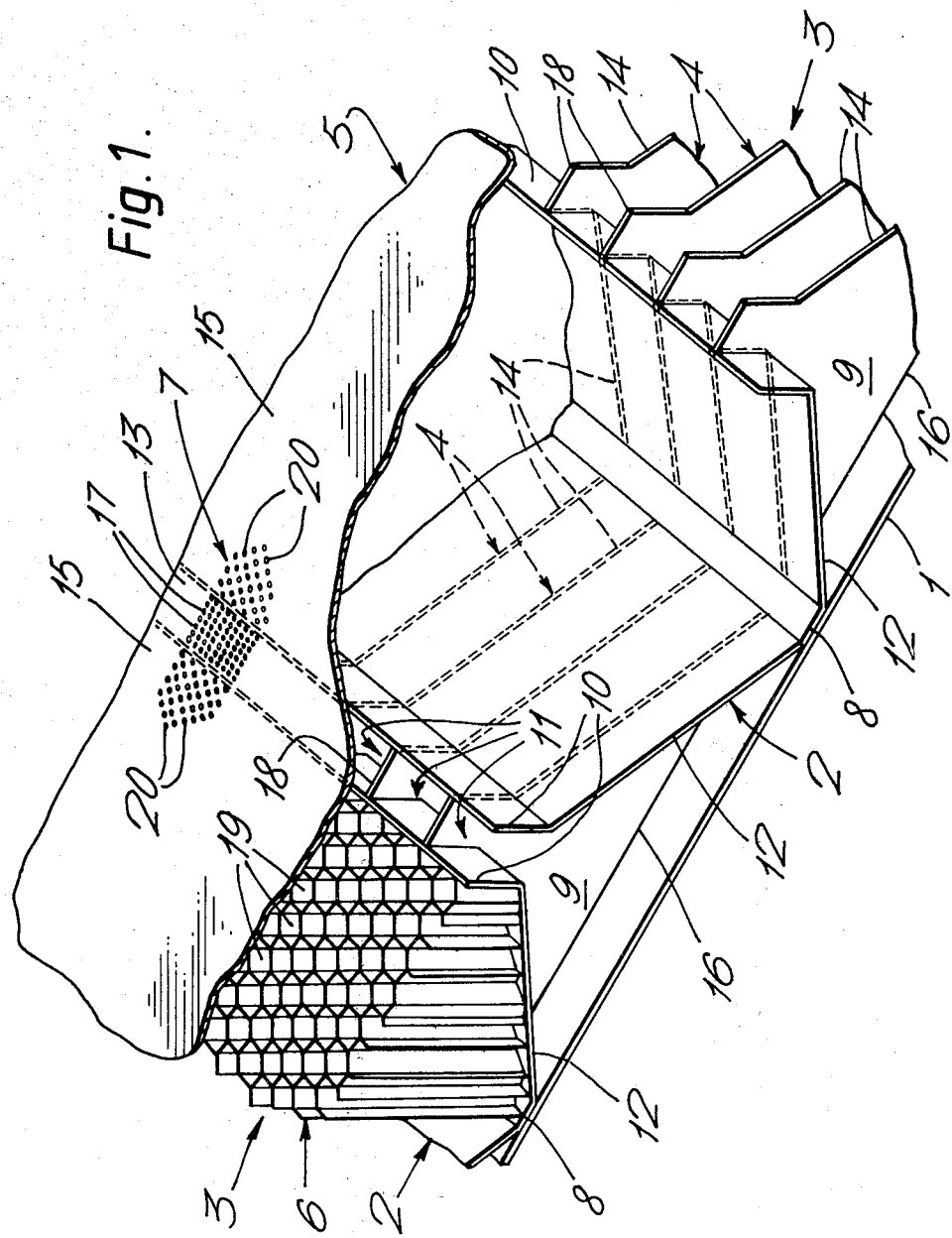
FIG. 1 is a "broken away" perspective view showing the structure of an acoustic lining embodying the present invention.

The drawings are not to scale.

Referring to FIGS. 1 and 2, a multi-layer acoustic lining for the intake or exhaust duct of a gas turbine aeroengine comprises an impermeable backing layer 1, a compartmented airspace core structure 3, and a sound permeable facing layer 5 in the form of a perforated sheet, a token number of perforations being indicated at 7. In FIG. 1, parts of the core structure 3 and facing layer 5 have been removed in order to show the remaining parts more clearly.

The core structure 3 is assembled from three basic types of components, viz. approximately V-shaped channels 2, wall members 4 and honeycomb cellular structure 6.

The V-shaped channels 2 are disposed in side-by-side relationship within core structure 3, being attached to backing layer 1 by small flat base portions 8 and to the face layer 5 by the flanges 10 at the end of each limb 12 of the V-shape. Limbs 12 act as inclined partitions within the core structure, and will hereinafter be identified as such.

Shoulders 14 of wall members 4 support inclined partitions 12 and are attached thereto. The bases 16 of wall members 4 are attached to the backing layer 1. It will be seen that wall members 4 are disposed at right angles to the longitudinal extent of channels 2 and act to divide up the volumes of space between adjacent channels 2 into compartments 9. Each wall member 4 has a tongue portion 18 which extends between pairs of flanges 10 to meet overlying portions 13 of face sheet 5 and is preferably attached to both the flanges and the face sheet.

The honeycomb cellular structure 6 occupies all the available space within each channel 2 under the overlying portions 15 of face sheet 5. The cellular structure 6 is bonded to both the underside of face sheet 5 and the upper sufaces of channels 2 and thus each honeycomb cell defines a compartment 19 extending between the face sheet 5 and a portion of one of the channels 2.

It will be seen from the above that the core structure 3 comprises two types of compartments, 9 and 19 respectively. These compartments are designed to have resonant frequencies which give the acoustic lining a low frequency response plus a broad band high frequency response.

The low frequency response is provided by compartments 9 which are intended to act as Helmholtz-type resonators. As can be seen, two opposing sides of each compartment 9 are formed by the inclined partitions 12, the other sides being formed by wall members 4. Compartments 9 have resonator necks 11 which are situated within the core structure 3 and are formed by pairs of flanges 10 and tongue portions 18. Necks 11 receive sound energy via holes 17 in overlying portions 13 of the face sheet 5 and provide acoustic mass reactance affecting the resonant frequency of the compartments 9.

The high frequency response is provided by honeycomb cell compartments 19 which are intended to act as quarter-wave tube-type resonators. They are acoustically coupled at one end with the engine duct via holes 20 in overlying portions 15 of sheet 5. At their other ends, compartments 19 are acoustically divided from the compartments 9 by inclined partitions 12. Partitions 12 are impermeable in this embodiment of the invention, and therefore effectively blank off the ends of compartments 19. However, in some circumstances, it may be an advantage to compromise the performance of compartments 19 as quarterwave resonators by providing a degree of acoustical coupling through the partitions 12 between at least some of compartments 19 and compartments 9. Such coupling could be achieved by appropriate perforations in partitions 12. Those compartments 19 which are linked in this way to compartments 9 will then tend to act as additional Helmholtz resonator necks for compartments 9, as well as tube-type resonators, thus providing the acoustic lining 1 with an overall wider frequency response, but with the penalty of some loss in noise absorption efficiency.

It will be noted that by virture of their abutment with the inclined partitions 12 compartments 19 differ in length (and hence in resonant frequency) from one to another according to which part of partitions 12 divides them from compartments 9. The compartments are graded in length according to the frequency response required, and it is clear that such an arrangement as shown in FIG. 1 will absorb noise over a broader band of frequencies than would sets of similar compartments of constant length.

In the embodiment shown in FIG. 1, the Helmholtz type resonator compartments 9 are all of the same volume, and therefore they will all resonate at the same frequency. This will give good absorption of noise over a narrow low frequency band. In order to improve the low frequency response of the acoustic lining, it would be possible to vary the spacing of wall members 4 and thereby vary the Helmholtz resonant frequencies of compartments 9 from compartment to compartment in any desired manner. Besides varying the volumes of compartments 9, variation of spacing between wall members 4 also varies the volumes of the necks 11, and both volumes affect Helmholtz resonant frequency. Neck volumes can also be varied by varying the dimensions of flanges 10 and tongues 18. Such factors must be taken into account in designing the acoustic lining. For wide-band absorption, compartments 9 must be appropriately graded in resonant frequency.

In portions 13 of sheet 5 in FIG. 1, perforations 17 constitute a greater proportion of the total area of each portion 13 than the perforations 20 constitute of the total area of each portion 15, i.e. the portions 13 have a smaller acoustic resistance than portions 15. This may be necessary to ensure adequate acoustical coupling of compartments 9 with the engine duct.

FIG. 3 shows an acoustic lining similar in most details to that shown in FIG. 1. Details in FIG. 3 which have equivalents in FIG. 1 are given identical reference numbers and will not be further explained. Differences which do arise relate to the necks of the Helmholtz resonator compartments 9; which instead of being formed by the cooperation of flanges 10 with tongues 18 as in FIG. 1, are formed in FIG. 3 by some of the honeycomb cell compartments 19. Thus, in FIG. 3 the inclined partitions 12' are formed without flanges and the wall members 4' are formed without tongues 18. Neither partitions 12' nor wall members 4' are attached directly to face sheet 5, there being a gap between their respective free ends 30, 31 and the underside of face sheet 5. Instead of the honeycomb cellular structure being confined within the bounds of V-shaped channels 2', it bridges the gaps 32 between adjacent channels 2'. Therefore, instead of being acoustically divided from compartments 9' by partitions 12', those honeycomb cell compartments 19 which extend over gaps 32 are acoustically linked to compartments 9', thereby forming their necks.

FIG. 4 shows an acoustic lining which differs from that shown in FIGS. 1 and 2 only in that partitions 12'' are stepped rather than inclined. The construction shown gives an acoustic lining capable of absorbing three separate narrow high frequency bands rather than one wide high frequency band, because the honeycomb cell compartments are of three different lengths, $L_1$, $L_2$ and $L_3$, according to which step $S_1$, $S_2$ or $S_3$ of the partitions 12'' divides them from compartments 9'''.

The acoustic linings of FIGS. 1 to 4 may be made from sheet metal components glued, brazed or welded together. Polymer plastic materials may also be used if operating conditions allow, and preferably these would be reinforced with glass or graphite fibres for structural strength.

Although the face layer 5 is shown as a single layer of perforated sheet material, an aerodynamically smooth layer of a woven or felted type of material of appropriate acoustic resistance could overlie the face layer and be bonded to it in order to improve the aerodynamic characteristics of the acoustic lining.

I claim:

1. A multi-layer acoustic lining for a fluid flow duct comprising:

an impermeable backing layer;

a sound permeable facing layer spaced from said impermeable backing layer;

a plurality of Helmholtz resonators sandwiched between said backing layer and said sound permeable facing layer, said plurality of Helmholtz resonators being defined by a first set of resonator compartments, each of which is acoustically coupled to said sound permeable facing layer by a resonator neck means having a cross-sectional area restrictive relative to the cross-sectional area of the resonator compartments of the Helmholtz resonators;

a plurality of tube-type resonators sandwiched between said backing layer and said facing layer, said plurality of tube-type resonators being defined by a second set of resonator compartments, each of which is acoustically coupled directly to said permeable facing layer; and partition means providing an acoustic division between at least some of said first set of resonator compartments for said plurality of Helmholtz resonators and said second set of resonator compartments for said plurality of tube-type resonators, said partition means providing at least some of said plurality of tube-type resonators with different resonant frequencies.

2. A multi-layer acoustic lining according to claim 1 in which said partition means includes a step-wise partition between said sound permeable facing layer and said impermeable backing layer, said step-wise partition providing said tube-type resonators with differing lengths and resonant frequency according to which step in said partition means acoustically divides the tube-type resonators from the Helmholtz resonators.

3. A multi-layer acoustic lining according to claim 1 in which said partition means includes an inclined partition between said sound permeable facing layer and said impermeable backing layer, said inclined partition providing said tube-type resonators with differing lengths and resonant frequency depending upon where said tube-type resonators abut said inclined partition and are acoustically divided from said plurality of Helmholtz resonators.

4. A multi-layer acoustic lining according to any one of claims 1 to 3 in which some of said second set of compartments function as said resonator neck means for at least some of said plurality of Helmholtz resonators.

5. A multi-layer acoustic lining as claimed in any one of claims 1 to 3 in which said partition means have portions defining at least portions of said resonator neck means for each of said plurality of Helmholtz resonators.

6. A multi-layer acoustic lining according to any one of claims 1 to 2 in which at least some of said tube-type resonators are acoustically coupled to some of said first set of resonator compartments of said Helmholtz resonators.

7. A multi-layer acoustic lining according to any one of claims 1 to 3 in which said partition means includes opposite sides of said first set of resonator compartments of said plurality of Helmholtz resonators, and wall members disposed transversely of said partition means to define other sides of said first set of resonator compartments for said plurality of Helmholtz resonators.

8. A multi-layer acoustic lining according to any one of claims 1 to 3 in which said first set of resonator compartments for said plurality of Helmholtz resonators have differing resonant volumes.

9. A multi-layer acoustic lining according to any one of claims 1 to 3 in which said resonator neck means for said plurality of Helmholtz resonators have differing volumes.

10. A multi-layer acoustic lining according to any one of claims 1 to 3 in which said plurality of tube-like resonators defined by said second set of resonator compartments are cells of a honeycomb cellular structure.

* * * * *